(No Model.) 2 Sheets—Sheet 2.

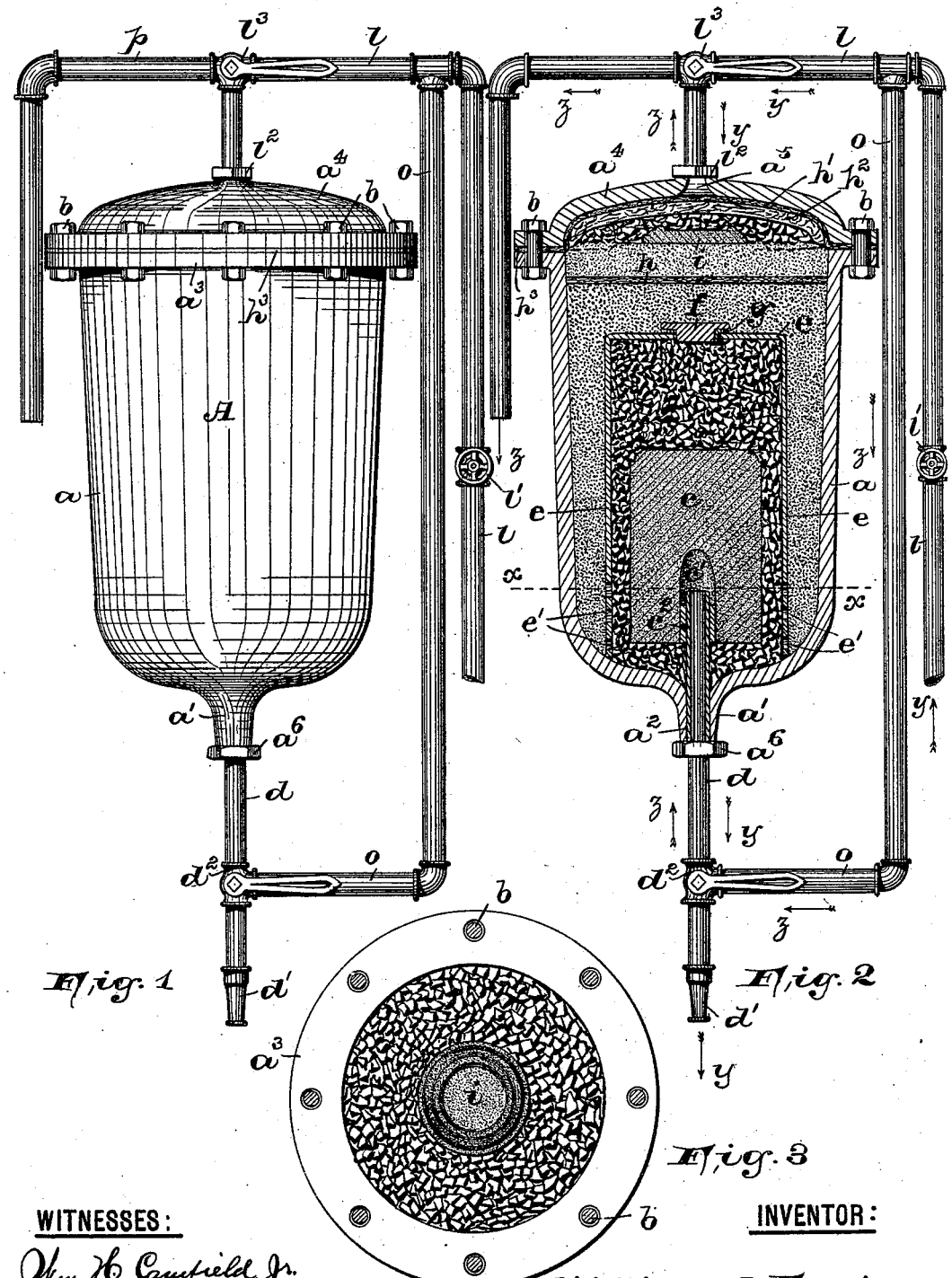

W. A. FREISE.
FILTER AND METHOD OF CLEANING SAME.

No. 528,630. Patented Nov. 6, 1894.

WITNESSES:
Wm. H Canfield Jr.
W. B. Fraentzel.

INVENTOR:
William A. Freise,
BY Fred C. Fraentzel, ATT'Y.

UNITED STATES PATENT OFFICE.

WILLIAM A. FREISE, OF NEWARK, NEW JERSEY.

FILTER AND METHOD OF CLEANING SAME.

SPECIFICATION forming part of Letters Patent No. 528,630, dated November 6, 1894.

Application filed November 10, 1893. Serial No. 490,506. (No model.)

*To all whom it may concern:*

Be it known that I, WILLIAM A. FREISE, a citizen of the United States, residing at Newark, in the county of Essex and State of New Jersey, have invented certain new and useful Improvements in Filters and Methods of Cleaning the Same; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in water filters and a method of cleaning the same; the purpose of the invention being to provide a system of water-purification whereby the organic and inorganic matter held in solution in the water may be removed, leaving the water free from any impurities that tend to render the same unfit for use.

A further purpose of the invention is to provide a system of piping in connection with the filter proper, whereby, by the manipulation of certain valves in the piping the flow of water through the filter and its filtering material from the top to the bottom, can be reversed and caused to flow from the bottom to the top, whereby all the objectionable sediments in the filter are successfully forced from an outflow pipe connected with the top of the filter.

My improved water filter is illustrated in the accompanying drawings, in which—

Figure 4:
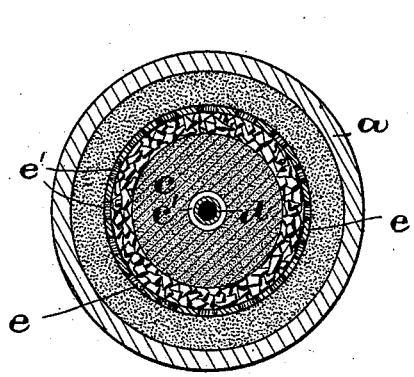
Figure 5:
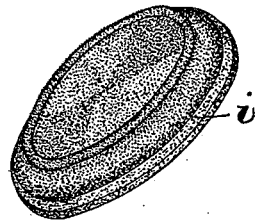
Figure 6:
Figure 7:
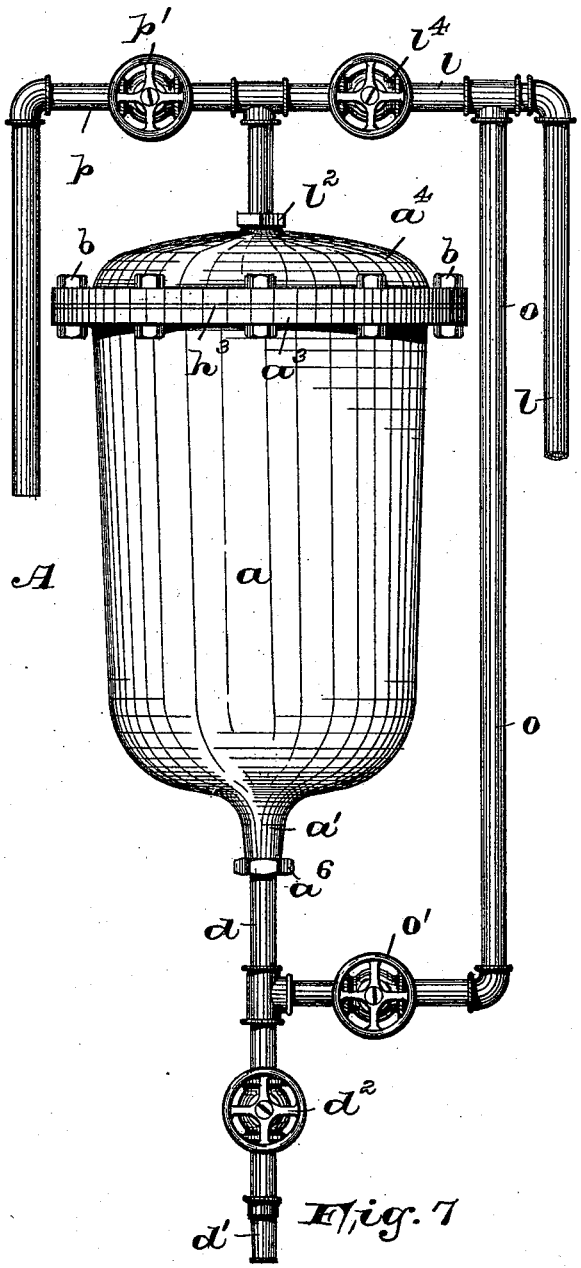

Figure 1 is a front elevation of a filter and the system of piping connected therewith. Fig. 2 is a vertical section of the filter, clearly illustrating the particular filtering arrangement within the apparatus, and Fig. 3 is a top view of the apparatus with the top cover removed, showing the arrangement of a spreading plate within the apparatus, which causes the water to spread on all sides within the filter. Fig. 4 is a horizontal section taken on line $x$ in Fig. 2. Fig. 5 is a perspective of said spreader, and Fig. 6 is a similar view of a filter block, made of bone coal or animal coal. Fig. 7 is a front elevation of the filter and system of piping connected therewith, having a slightly modified arrangement of valves in said piping, from that illustrated in Figs. 1 and 2.

In said views, similar letters of reference are used to indicate corresponding parts.

A in the above described views, indicates the tank or reservoir in which the soluble matter in the water is to be separated therefrom and the water purified. Said tank or reservoir consists substantially of a bottom portion $a$, having a neck $a'$ in the bottom provided with an outlet or opening $a^2$. The upper and open part of said portion $a$ of the tank is provided with an annular flange $a^3$ having bolt holes therein.

In order to construct my filter, the dome-shaped cover $a^4$ is removed. A filter block $c$ made of compressed fine animal or bone coal, and provided with a recess $c'$ in its bottom, is placed in position over the end of a pipe $d$ extending up through said opening $a^2$ in the neck $a'$ and secured in position therein and made water tight by a suitable nut $a^6$. The end of said pipe $d$ is sufficiently fastened in said recess $c'$ of the block $c$ by means of a suitable cork $c^2$, as will be seen from Fig. 2. An ordinary tin can $e$, open at the bottom, and provided with suitable holes or perforations $e'$ is then placed over said filter block $c$ in said portion $a$ of the tank A. Through an opening in the top of said can $e$, is then inserted the nozzle of a funnel and the inner space between said can and the filter block $c$ is filled with comparatively coarse coal. This having been accomplished, the funnel is removed, a rubber gasket $g$ is placed on said hole in the top of the can $e$ and a cork or block $f$ employed to seal said opening. The remaining portion $a$ of the tank A is then filled to about three-quarters full with fine bone or animal coal on which is placed a layer of woven asbestos $h$ and on top of this another layer of coal, and finally in the center of the upper surface of said layer of coal is placed a spreader $i$, of the shape illustrated in Figs. 2, 3 and 5. Within said dome-shaped cover $a^4$, I place a layer of woven asbestos $h'$, then a layer of loose asbestos fiber $h^2$, and on this a thin layer of coarse animal or bone coal. This cover is turned over and quickly placed in position on the flange $a^3$ of the part $a$ of the tank A, and the several parts are securely fastened together with the bolts or screws $b$. The surrounding edge $h^3$ of the asbestos cloth $h'$, is placed and secured between the flange on the portion $a$ and the flange on the cover, thereby making a perfectly water-tight joint.

Leading into the top of the tank A is the water supply pipe $l$, provided with a suitable valve or shut-off cock $l'$, said pipe being secured to said dome-shaped cover by means of a suitable nut $l^2$. Extending from the bottom of said tank A, is the outflow pipe $d$, already mentioned, said pipe being preferably provided with a nozzle $d'$ and a valve or shut-off cock $d^2$. Thus, when it is desired to filter the water, the valve or cock $l'$ in the pipe $l$ and the valve or cock $d^2$ in the pipe $d$ are opened. This permits the water to travel in the direction of arrows $y$ through the pipe $l$ into the filtering tank A, when the water falls from the inlet pipe upon the spreader $i$, then passes through the several filtering or cleansing media, finally through the filter block $c$ and out through the pipe $d$ in a clear and pure state, free from any disagreeable taste or smell, while the impurities have remained in the filtering material within the tank A.

In order to thoroughly clean the filter and from time to time remove any impurities that have settled on the filter block or in the small filtering layers, I place in the pipe $l$ a three-way cock $l^3$, make the cock $d^2$ also a three-way cock and connect the pipes $l$ and $d$ with an intermediate pipe $o$, and to the said three-way cock $l^3$ I attach a discharge pipe $p$. Then by properly manipulating the valves or cocks $l^3$ and $d^2$ the course of the water is reversed from its previous course, passing through the pipe $o$ into pipe $d$, and up through said pipe $d$ into the filter block $c$, the water being finally driven through the filtering medium into the pipe connected with the cover of the tank A, and then out of the blow-out pipe $p$, thereby carrying all dirt and impurities with the water, as indicated by the arrows $z$. As soon as the water discharging from the end of the pipe $p$ becomes clear, then the cocks or valves $l^3$ and $d^2$ are again turned and the water from the pipe $l$ can again be made to pass into the filter at the top and out of the pipe $d$ in the bottom.

Instead of the arrangement of the two three-way cocks $l^3$ and $d^2$ in the pipes $l$ and $d$ respectively, a valve $l^4$ may be placed in the pipe $l$, a valve $o'$ in the pipe $o$ and a valve $p^7$ may be placed in the pipe $p$, as clearly illustrated in Fig. 7.

By opening the valve $l^4$ and closing valve $o'$ and $p'$ the water flows into the top of the filter tank A, and vice versa, by closing the valves $l^4$ and $d^2$, and opening the valves $o'$ and $p'$, the water is directed into the tank at the bottom, forcing its way through the filtering medium and finally being discharged from the pipe $p$, at the same time removing all impurities and sediment in the filter.

One of the essential and most important features of my invention is the general inner arrangement of the parts of the filter, that is, the arrangement of the several layers of coal and the filter block and can $c$, which are old in themselves, with the arrangement of the layers of asbestos $h'$ and $h^2$ which is new in combination with said old elements.

Another important feature is the addition of the intermediately arranged pipe $o$ with the other system of piping and the pipe $p$, all connected with the filter tank, substantially as described, and the several valves arranged in said system of piping, whereby the stream of water can be made to pass through the filter, either from the top to the bottom or the bottom to the top, as may be desired.

Having thus described my invention, what I claim is—

1. The herein described filter, comprising therein a body $a$, a dome shaped cover thereon, means for securing said cover to said body $a$, a can $e$ in said body $a$, having perforations $e'$, a filter block $c$, a filtering medium between said can and filter block, a filtering medium surrounding said can, a sheet of asbestos $h$, a layer of filtering material thereon, a spreader on said filtering material and in said cover, a sheet of asbestos $h'$, secured in said cover to prevent its displacement, a layer of asbestos material $h^2$ and a layer of coarse filtering material, all arranged substantially as and for the purposes set forth.

2. The herein described filter, comprising therein a body $a$, a dome-shaped cover thereon, means for securing said cover to said body $a$, a can $e$ in said body $a$, having perforations $e'$, a filter block $c$, a filtering medium between said can and filter block, a filtering medium surrounding said can, a sheet of asbestos $h$, a layer of filtering material thereon, a spreader on said filtering material and in said cover, a sheet of asbestos $h'$, a layer of asbestos material $h^2$ and a layer of coarse filtering material, in combination, with a pipe $l$ connected with said dome-shaped cover, a pipe $d$ connected with said tank at the bottom, a pipe $o$ connecting said pipes $l$ and $d$, a pipe $p$ connected with said pipe $l$, and shut-off cocks or valves in said pipes $l$ and $d$, substantially as and for the purposes set forth.

In testimony that I claim the invention set forth above I have hereunto set my hand this 25th day of October, 1893.

WILLIAM A. FREISE.

Witnesses:
 FREDK. C. FRAENTZEL,
 WM. H. CAMFIELD, Jr.